United States Patent
Fuller

(10) Patent No.: US 6,591,595 B1
(45) Date of Patent: Jul. 15, 2003

(54) BRUSH CUTTER AND METHOD

(76) Inventor: George A. Fuller, 507 Hines St., High Point, NC (US) 27260

( * ) Notice: Subject to any disclaimer, the term of this patent is extended or adjusted under 35 U.S.C. 154(b) by 0 days.

(21) Appl. No.: 09/956,528

(22) Filed: Sep. 20, 2001

(51) Int. Cl.$^7$ ............................................... A01D 34/66
(52) U.S. Cl. ....................................... 56/13.6; 56/320.1
(58) Field of Search ........................... 172/42; 56/16.4, 56/17.3, 17.5, 500, 16.7, 320.1, 2, 13.6, 10.1, 314, 15.2; 144/34.1, 336

(56) References Cited

U.S. PATENT DOCUMENTS

| | | | |
|---|---|---|---|
| 3,882,910 A | * 5/1975 | Peltola et al. | 144/4.1 |
| 4,112,656 A | 9/1978 | Ranko et al. | |
| 4,338,985 A | * 7/1982 | Smith et al. | 144/34.1 |
| 4,354,341 A | 10/1982 | Hathaway | |
| 4,769,977 A | * 9/1988 | Milbourn | 56/15.2 |
| 4,949,534 A | * 8/1990 | Evans | 56/6 |
| 4,996,830 A | * 3/1991 | Davison | 56/14.7 |
| 5,560,189 A | 10/1996 | Devillier et al. | |
| 5,655,581 A | 8/1997 | Craft | |
| 5,901,538 A | * 5/1999 | Vohl | 56/15.2 |
| 6,003,292 A | * 12/1999 | Waibel | 56/302.2 |

* cited by examiner

Primary Examiner—Robert E. Pezzuto

(57) ABSTRACT

A gasoline engine powered walk behind brush cutter for small trees and the like has a vertical blade available for cutting low-lying tree limbs and other vegetation and has a horizontal blade for cutting small tree trunks or the like. A manual grappler is affixed to the frame of the brush cutter to direct the vegetation into, for example the vertical cutting blade. This device is particularly useful for clearing shrubbery and other vegetation from overgrown lots and in confined areas where larger vehicles cannot maneuver.

19 Claims, 5 Drawing Sheets

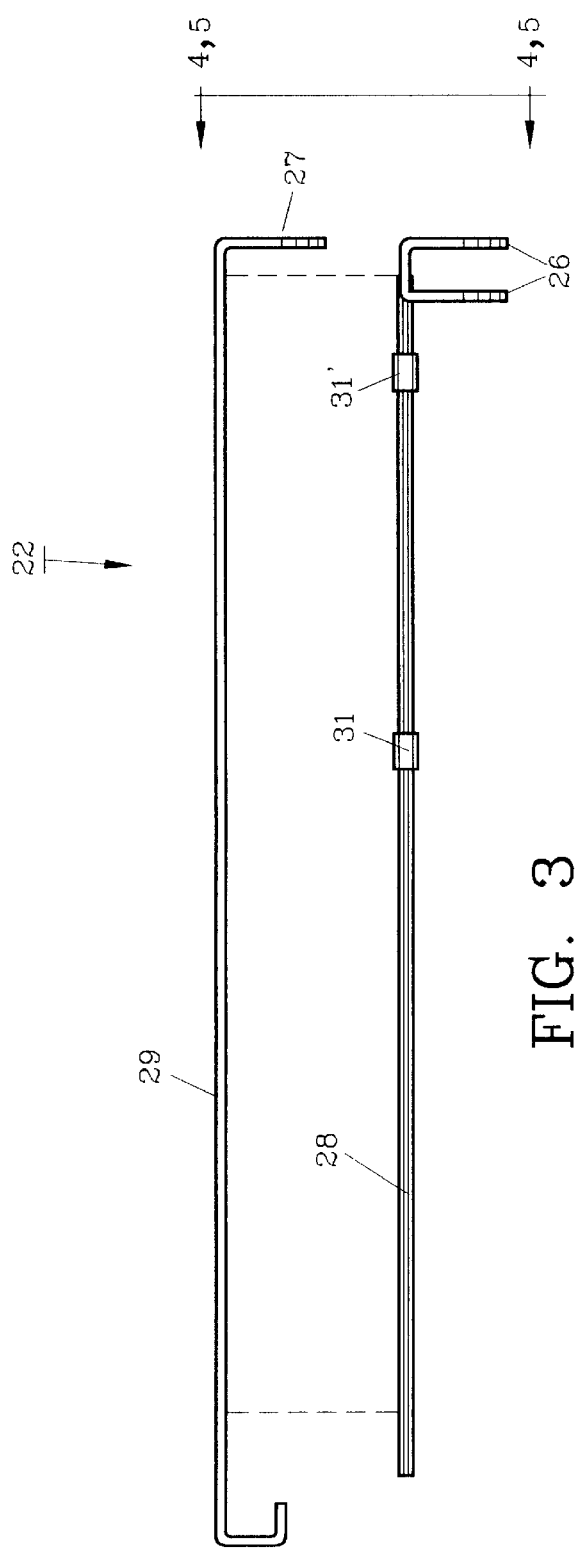
FIG. 3
FIG. 5
FIG. 4

BRUSH CUTTER AND METHOD

FIELD OF THE INVENTION

The invention herein pertains to a machine for cutting small trees, shrubbery, brush and the like and particularly pertains to a brush cutter which is manually propelled.

DESCRIPTION OF THE PRIOR ART AND OBJECTIVES OF THE INVENTION

Various tools and implements have long been used for clearing overgrown lots and for removal of vegetation such as small trees, bushes, vines and similar growth. Some of the more common tools employed are handheld, such as chainsaws, hedge clippers and weed trimmers. These tools are useful but physical stamina is needed for a worker to operate over an entire workday due to the strength and dexterity required. Vehicle attached stump grinders and tree cutters are often employed for removing larger trees, such as in clearing woods and forests. These machines are valuable but costly and require skilled and trained personnel. Also these devices are not suitable for use in small, confined areas such as between closely adjoining houses and buildings.

Thus, there has existed a need and one objective is to provide a manually operable brush cutter which can be easily, manually rolled to a desired location by an individual for removing brush and undergrowth but which will also remove small trees, especially in confined areas around homes and buildings.

It is also an objective of the present invention to provide a manually propelled brush cutter and method of use having blades powered by an internal combustion engine mounted on a frame with a handle for steering the same.

It is yet another objective of the present invention to provide a brush cutter and method of use having a grappler which allows the operator to grasp shrubbery, tree limbs or the like and direct the same into rotating cutting blades whereby the brush cutter can remain stationary while the shrubbery is cut.

It is yet still another objective of the present invention to provide a brush cutter having a pair of cutting blades which are mounted perpendicular to one another.

It is also an objective of the present invention to provide a brush cutter which includes a tool basket for conveniently carrying hand tools or the like.

It is a further objective of the present invention to provide a brush cutter which can be easily, manually manipulated by the operator to obtain a desirable cutting posture.

Various other objectives and advantages of the present invention will become apparent to those skilled in the art as a more detailed description is set forth below.

SUMMARY OF THE INVENTION

The aforesaid and other objectives are realized by providing a brush cutter and method which includes a frame supporting a small horsepower gasoline powered engine. The engine drives two circular cutting blades. The frame includes a handle for manual manipulation and driving the brush cutter and mounted thereon is an engine speed control lever. The blades which are perpendicularly aligned, one horizontal and one vertical, are rotatably attached to the frame and are chain driven by the engine. A pivotally mounted adjustable grappler is affixed by a bracket to the frame proximate the vertical blade and which is releasably attached to the handle. The grappler can be disengaged from the handle and manually manipulated to grasp and draw limbs, brush or the like into the vertical and/or horizontal blade for cutting purposes. A pair of wheels are mounted to the frame, beneath the engine, which allows the operator to pivot the frame and blades to the most advantageous angle while cutting brush or small trees. A pair of skids are also mounted on the frame rearwardly of the wheels. The skids allow the brush cutter to rest thereon and also provides a pivot point rearward of the wheels which allows the blades to be raised higher as needed when the handle is urged downwardly.

In use, the operator pushes the brush cutter to a desired location, starts the engine and commences cutting brush with the horizontal blade. Should it be desirable to remove low-lying limbs or brush, the operator simply uses the grappler to grasp such brush and pull it towards for example, the vertical blade while the engine (and blades) remain operating. The grappler can be returned to its dormant position attached to the handle after use and the brush cutter pushed to a new location for further brush cutting and removal.

BRIEF DESCRIPTION OF THE DRAWINGS

FIG. 3 demonstrates the grappler removed from the brush cutter with the rod and sleeve separated for explanatory purposes;

FIG. 4 pictures an enlarged end view of the grappler with the tines open;

FIG. 5 depicts an end view of the grappler with brush captured within the closed tines;

DETAILED DESCRIPTION OF THE PREFERRED EMBODIMENTS AND OPERATION OF THE INVENTION

Figure 1:
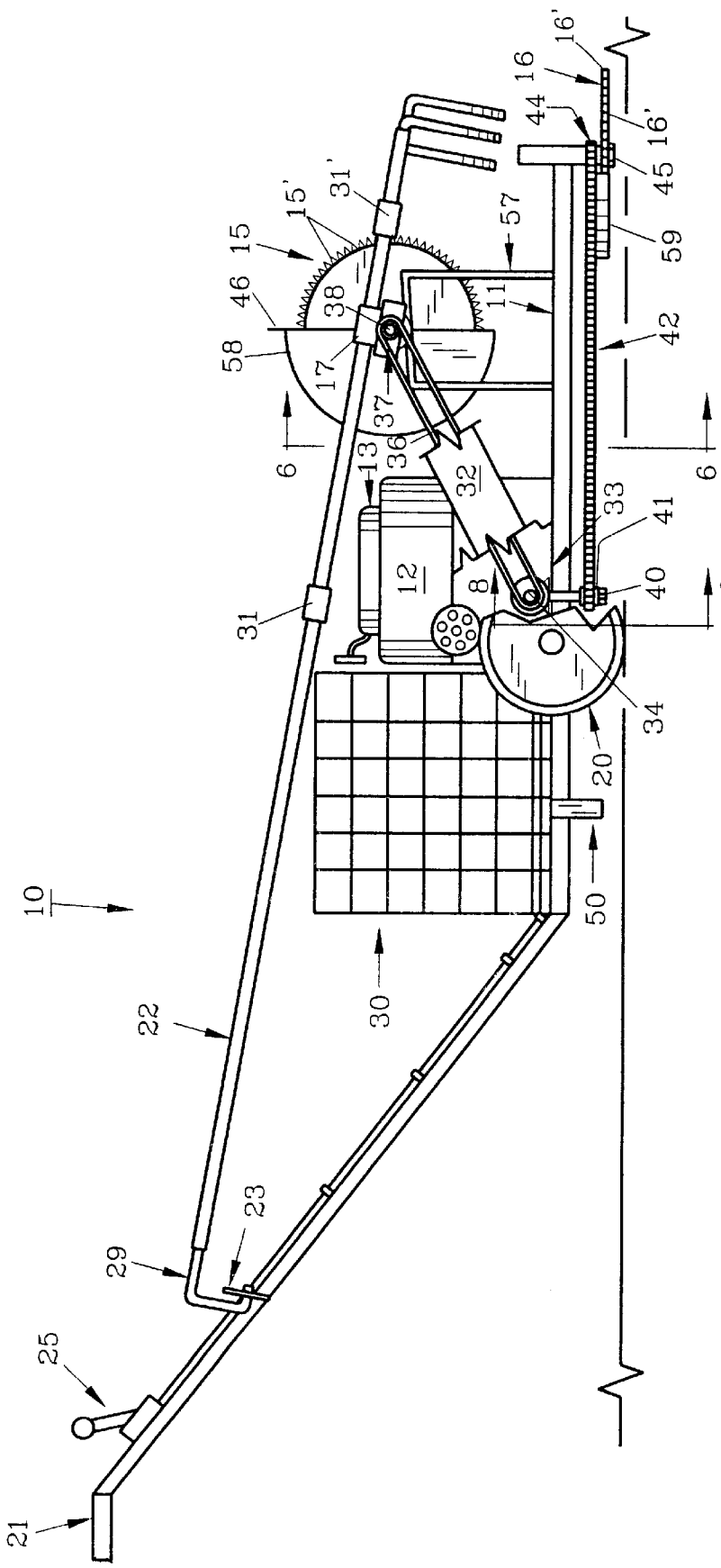
FIG. 1 shows a left side elevated view of the brush cutter of the invention with certain components fragmented for clarity.

For a better understanding of the invention and its operation, turning now to the drawings, FIG. 1 shows a side elevational view of preferred walk behind brush cutter 10 having frame 11 formed from tubular steel which supports a standard three and one half (3½) horsepower, four cycle internal combustion gasoline engine 12 having pull starter 13 positioned thereon. Engine 12 drives vertical blade 15 having a plurality of teeth 15' and horizontal blade 16 having a plurality of teeth 16' mounted forwardly thereof through blade drive assembly 33. Delt guard 32 is shown cut-away for clarity purposes. As seen, brush cutter 10 is pivotal about the two wheels 20 (only one wheel shown in FIG. 1) by raising or lowering handle 21 as further seen in FIG. 2. Also in FIG. 1, grappler 22 is releasably attached to handle 21 by ring 23 attached to handle 21. In use, grappler rod 29 is urged rearwardly (right to left in FIG. 1) for disengagement from ring 23.

Conventional speed control 25 is attached to handle 21 to allow the operator (not shown) convenience in increasing or decreasing the speed or turning off internal combustion engine 12. Tool basket 30 is also shown in FIGS. 1 and 2 which is preferably formed of sturdy wire mesh and is affixed to frame 11 to provide accessible storage for hand tools (not seen) as may be needed by the operator.

Figure 6:
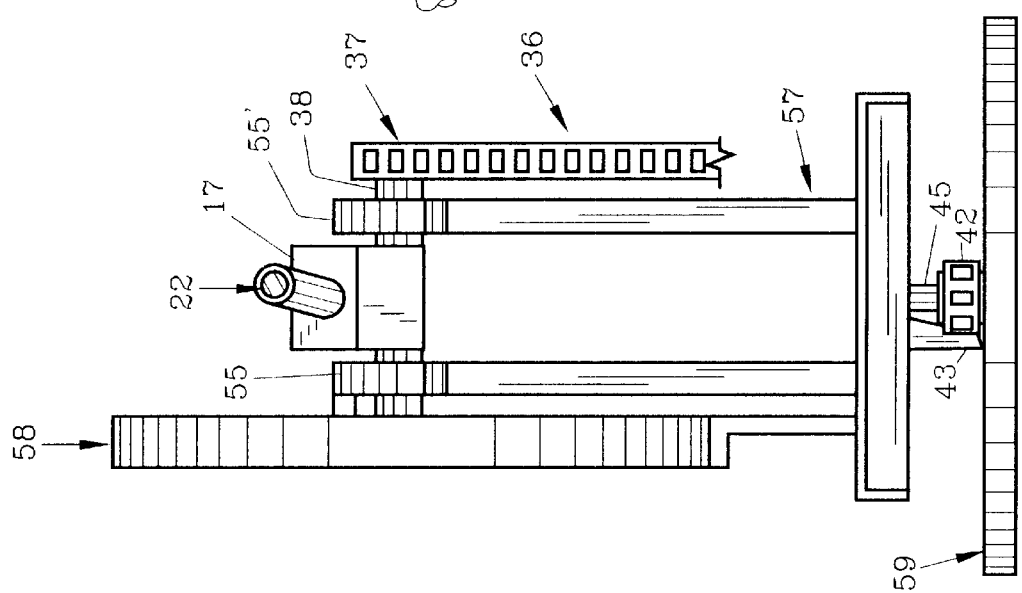
FIG. 6 shows an enlarged fragmented sectional view of the brush cutter along lines 6—6 of FIG. 1.
Figure 8:
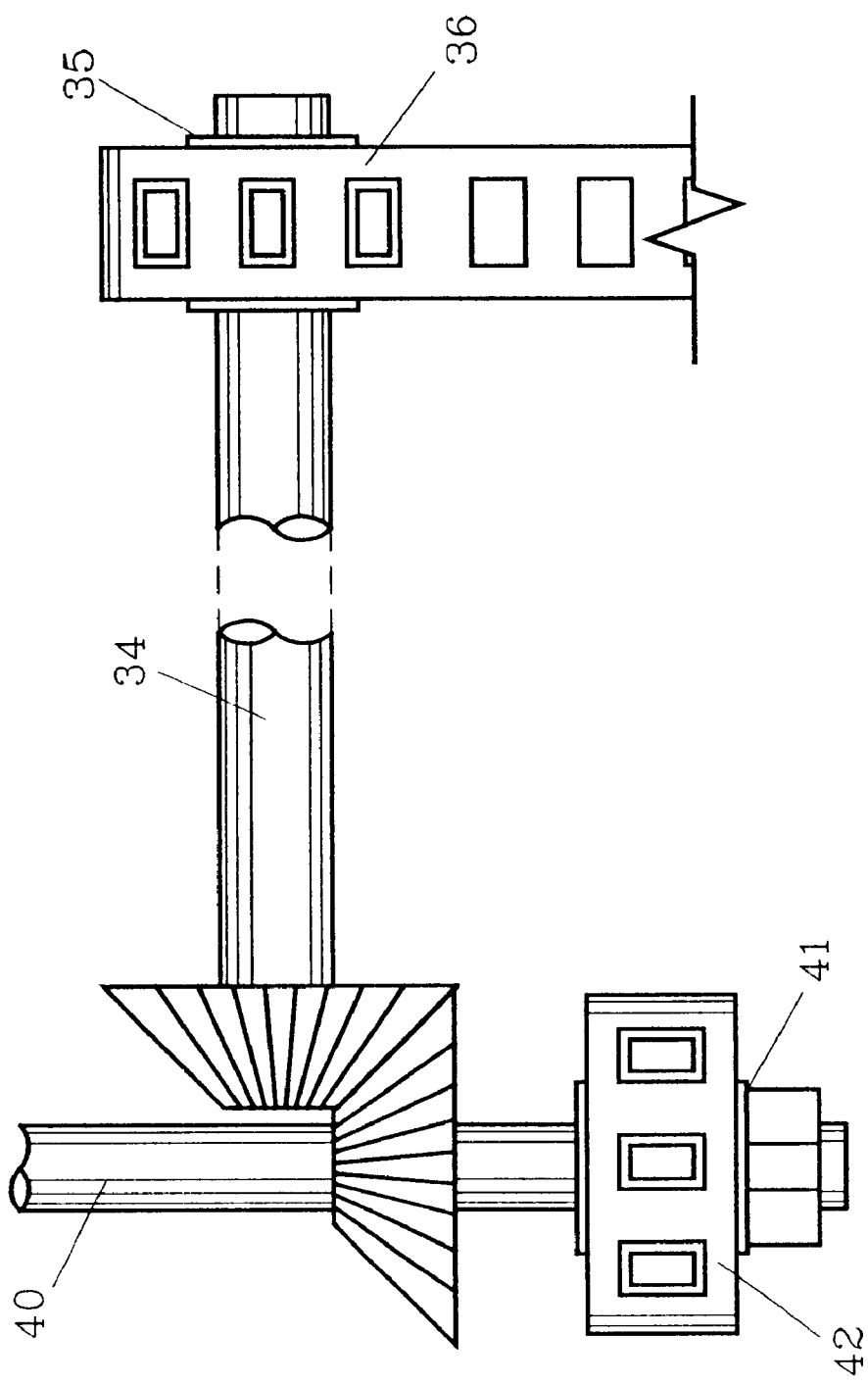
FIG. 8 demonstrates an enlarged partial view of the drive mechanism as seen along lines 8—8 of FIG. 1.

As illustrated in FIGS. 1, 6 and 8, blade drive assembly 33 is joined to horizontal shaft 34 (see FIG. 8) and includes sprocket 35 for turning chain belt 36. Sprocket 37 (FIG. 6) likewise engages chain belt 36 and is affixed to blade shaft 38.

Vertical engine shaft 40 in FIGS. 1 and 8 rotates sprocket 41 joined thereto and horizontal chain belt 42. Sprocket 44 (FIG. 1) likewise engages chain belt 42 for driving horizontal blade 16 and is affixed to vertical shaft 45 with sprocket 44 attached. As would be understood, as engine 12 runs, vertical blade 15 and horizontal blade 16 continually turn for cutting purposes, both driven by engine shaft 40. A vine cutter blade (not shown) is positioned near blade shaft 45 above blade 16 and is affixed to frame 11 to cut any vines that may wrap around blade shaft 45 above blade 16.

Figure 2:
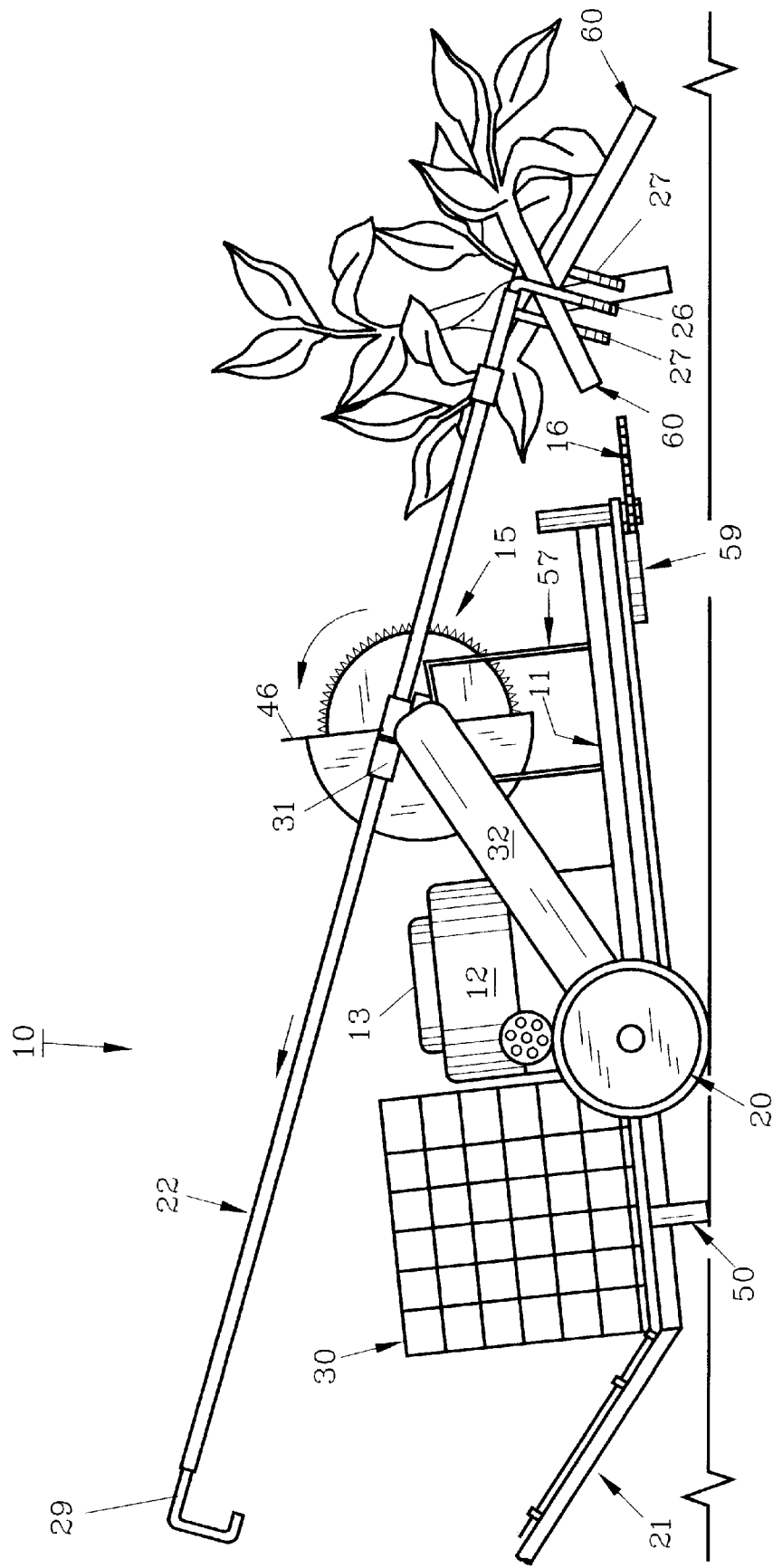
FIG. 2 illustrates the brush cutter of FIG. 1 in a tilted posture grasping a limb for urging into a blade.
Figure 7:
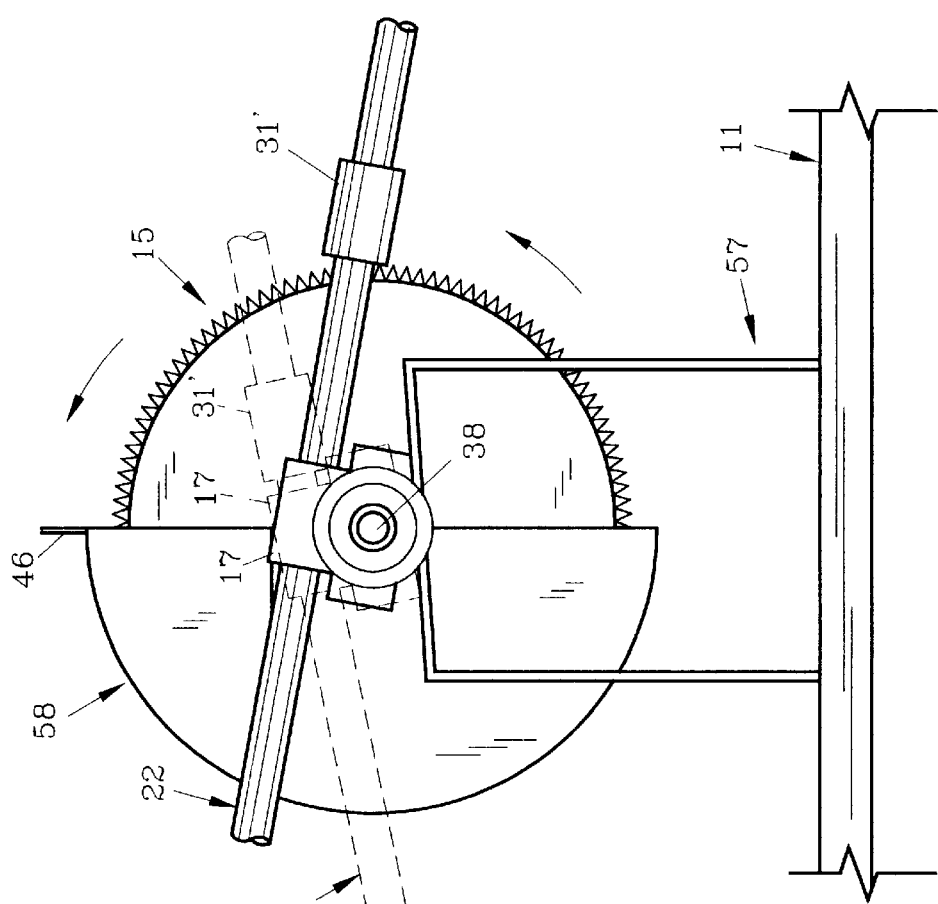
FIG. 7 features an enlarged view of the vertical blade and fragmented view of the grappler as shown in FIG. 2 with a ghost view of the grappler as pivoted.

Brush cutter 10 as shown in FIG. 2 is in a tilted posture resting on two skids 50 (only one shown) which are attached to frame 11 and positioned under tool basket 30. By pressing handle 21 downwardly, brush cutter 10 is tilted thereby raising blades 15, 16 as needed. Grappler 22 has been disengaged from ring 23 and is closed to surround brush 60. As seen in FIGS. 3, 4 and 5, grappler tines 26, 27 which are connected respectively to grappler sleeve 28 and grappler rod 29 respectively for rotational motion to open and close tines 26, 27. Grappler 22 in addition to being rotatably joined slidably passes through channel 17 which is attached pivotally to blade shaft 38 as shown in FIGS. 1 and 7. Grappler stop members 31, 31' are affixed to grappler sleeve 28 (FIG. 3) to limit the sliding motion thereof through channel 17 and prevent tines 26, 27 from striking circular blade 15.

Grappler 22 will also pivot upwardly and downwardly as shown in FIG. 7, seen in ghost fashion to illustrate the pivoting motion. Channel 17 is thus pivotally joined to horizontal blade shaft 38 to allow grappler 22 to pivot as needed during grasping and urging of vegetation and brush limbs 60 as shown in FIGS. 2, 4 and 5. Blade shaft 38 is affixed to blade 15 as further shown in enlarged view in FIG. 6. Shaft 38 is positioned through pillow blocks 55, 55' which are mounted to blade support bracket 57. Support bracket 57 is affixed to frame 11 as shown in FIGS. 1 and 7. Blade guard 58 is preferably formed of steel and partially encloses vertical blade 15 as shown in FIG. 7 for safety purposes and includes vertical section 46 to prevent limbs, etc. from passing over blade guard 58. Blade guard 59 is also formed of steel and partially encloses circular horizontal blade 16 (FIGS. 2 and 6), also for safety purposes.

The preferred method of using brush cutter 10 includes manually driving brush cutter 10 to a suitable location on a building lot or the like having overgrown vegetation. Engine 12 is then started with pull starter 13 which drives horizontal blade 16 and vertical blade 15. Grappler 22 can be released from retaining ring 23 on handle 21 and manipulated as shown in FIG. 2 to grasp brush 60 limbs and the like. Grappler 22 can then be used to pull brush 60 into vertical blade 15 whereby low-lying tree limbs and the like are thus severed. Next, brush cutter 10 with engine 12 still running is manually directed to for example a small tree trunk (not shown). Blade 16 can then be used to cut a tree trunk at a depth of a few inches below ground level. The cut tree can then be grasped with grappler 22 and sawed as necessary with vertical blade 15 and subsequently disposed.

The illustrations and examples provided herein are for explanatory purposes and are not intended to limit the scope of the appended claims.

I claim:

1. A brush cutter comprising: a frame, an engine mounted on said frame, a first blade, said first blade defining a plurality of teeth, said first blade driven by said engine and a grappler, said grappler pivotally joined to said frame for directing brush to said blade, and a channel, said grappler slidably contained within said channel.

2. The brush cutter of claim 1 further comprising a pair of wheels, said wheels affixed to said frame.

3. The brush cutter of claim 1 wherein said first blade is circular and is vertically mounted to said frame.

4. The brush cutter of claim 1 further comprising a first blade drive mechanism, said first blade drive mechanism connected to said engine and to said first blade.

5. The brush cutter of claim 4 wherein said first blade drive mechanism comprises a chain, a blade sprocket, an engine sprocket, said chain attached to said engine sprocket and to said blade sprocket, said blade sprocket attached to said first blade for rotating the same.

6. The bush cutter of claim 1 further comprising a second blade, said second blade defining a plurality of teeth and driven by said engine.

7. The brush cutter of claim 6 further comprising a second blade drive mechanism, said second blade drive mechanism connected to said engine and to said second blade.

8. The brush cutter of claim 1 wherein said grappler comprises opposing tines, said tines manually operable.

9. The brush cutter of claim 1 further comprising a tool container, said tool container affixed to said frame.

10. A brush cutter comprising: a frame, an engine, said engine mounted on said frame, a first and a second blade, each of said blades defining a plurality of teeth, said first and said second blade rotatably mounted on said frame and driven by said engine, a grappler, a channel, said grappler slidably contained within said channel, said grappler pivotally attached to said frame for directing brush to one of said blades.

11. The brush cutter of claim 10 wherein said grappler comprises opposing tines, said tines for grasping brush therebetween.

12. The brush cutter of claim 11 wherein said grappler comprises a sleeve, one of said tines positioned on said sleeve, a rod, another of said tines positioned on said rod, said rod contained within said sleeve whereby turning said rod relative to said sleeve will cause said sleeve tine to move relative to said rod tine.

13. The brush cutter of claim 10 further comprising an axle, a pair of wheels, said wheels mounted on said axle, said axle affixed to said frame, a handle, said handle attached to said frame, whereby pivoting said handle about said wheels will raise and lower said blades.

14. The brush cutter of claim 13 further comprising a skid, said skid attached to said frame.

15. The brush cutter of claim 10 wherein said first blade is vertically mounted to said frame and said second blade is horizontally mounted to said frame.

16. A method of cutting brush with a walk behind cutter having a blade defining a plurality or teeth and a grappler having a rod positioned in a sleeve, said sleeve slidably positioned in a channel, said grappler having a rod tine and an opposing sleeve tine comprising the steps of:

a) grasping brush with the grappler;

b) urging the brush into the blade by urging the grappler towards the blade;

c) cutting the brush with the blade teeth; and d) releasing the brush from the grappler.

17. The method of claim 16 wherein grasping the brush comprises the step of opening the opposing grappler tines to manually grasp the brush.

18. The method of claim 16 wherein urging the grappler comprises the step of pulling the grappler towards the blade.

19. The method of claim 16 wherein releasing the brush comprises the step of opening the opposing grappler tines.

* * * * *